Dec. 10, 1940.   P. N. ROSEBY   2,224,697
ELECTRICAL SWITCHING DEVICE
Filed Feb. 9, 1938   2 Sheets-Sheet 1

INVENTOR
PHILIP NORTON ROSEBY
ATTY.

Dec. 10, 1940.   P. N. ROSEBY   2,224,697
ELECTRICAL SWITCHING DEVICE
Filed Feb. 9, 1938   2 Sheets-Sheet 2

*Fig.3.*

INVENTOR
PHILIP NORTON ROSEBY
ATTY.

Patented Dec. 10, 1940

2,224,697

UNITED STATES PATENT OFFICE 2,224,697

ELECTRICAL SWITCHING DEVICE

Philip Norton Roseby, Woodvale, near Southport, England, assignor to Associated Telephone & Telegraph Company, Chicago, Ill., a corporation of Delaware Application February 9, 1938, Serial No. 189,553
In Great Britain February 22, 1937

2 Claims. (Cl. 200—87)

The present invention relates to electrical switching devices employed in electrical signalling systems more particularly systems in which a plurality of switching or responding devices are operated simultaneously by high frequency signals superimposed on one or more conductors of an electrical supply system. The object of the invention is to provide an improved responding device for use in such systems which will be particularly sensitive since it is required to function only as a trigger device in response to the high frequency signal in order to bring about a switching operation under the control of a local source of power.

According to one feature of the invention in an electrical switching device a tuned reed is set in vibration in response to an incoming signal and thereupon moves into the path of a continuously driven member to cause the driving force normally applied thereto to be diverted to effect a local switching operation.

According to another feature of the invention in an electrical switching device a motor operating continuously is arranged to drive a train of gearing and in response to a signal a portion of the gearing is locked whereby a different portion of the gearing is driven by the motor to effect the operation of a switching member.

A further feature of the invention is that in an electrical switching device a motor operating continuously drives a train of epicyclic gearing one portion of which normally rotates idly while another portion is arranged to operate a switching member, the receipt of a signal serving to lock the first portion of the gearing so that the motor drive is effective to operate the switching member through the second portion.

The invention will be better understood from the following description of two methods of carrying it into effect reference being had to the accompanying drawings comprising Figs. 1–3.

Fig. 3 shows a modified form of the invention.

In the example first to be described the receiving device comprises essentially a synchronous or other motor preferably of the self-starting type which is continuously driven and which applies its power to an arrangement of epicyclic gearing. Under normal conditions in the absence of a signal the gearing is turned over idly without the motor performing any switching function. On receipt of a signal however the reed is vibrated to arrest the motion of a certain portion of the gearing and as a result the power from the motor is diverted to execute the required switching operation.

Figure 1:
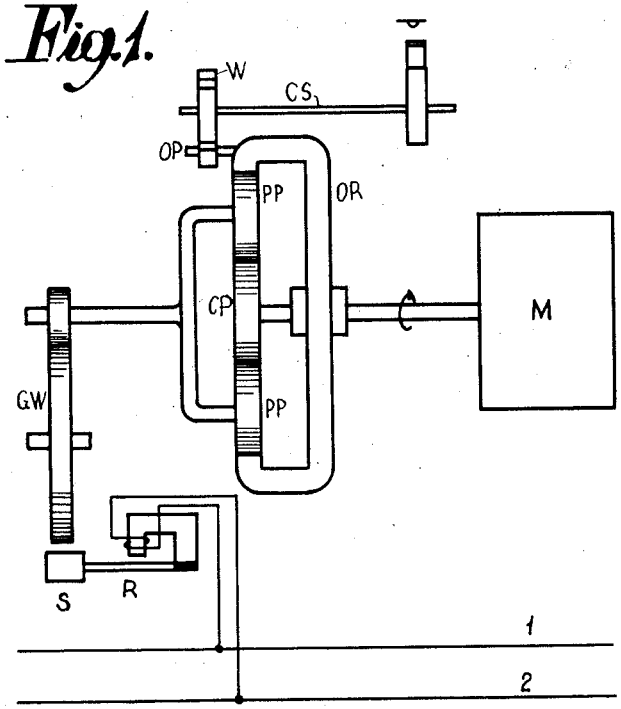
Fig. 1 is a diagrammatic view of one form of the device.
Figure 2:
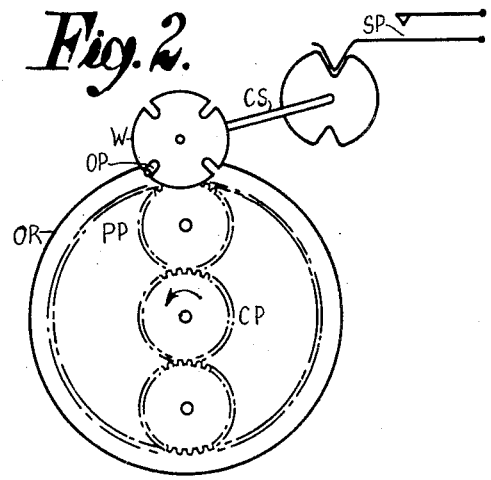
Fig. 2 is a view showing the gear system and, in perspective, the cam and contacts of the device shown in Fig. 1.

Referring now to Figs. 1 and 2 of the drawings it will be appreciated that the motor is designated M and the vibrating reed is designated R. The motor is assumed to be rotating in an anti-clockwise direction from the point of view of Fig. 2 and drives the central pinion CP so that the two planetary pinions PP located above and below tend to be rotated in a clockwise direction. Due to the drag of the other gearing the internally toothed outer ring OR is urged also in a clockwise direction until the operating pin OP in its periphery comes up against a slot in the wheel W driving the cam shaft CS. This is the position shown in the drawings.

In this position the load of the cam shaft exceeds the drag in the gearing so that the outer ring is held and the upper and lower planetary pinions now commence to idle round the driving pinion in an anti-clockwise direction.

Upon receipt of the high frequency signal over the conductors 1 and 2 of the network, the reed R responds and causes sprag member S to enter the teeth of a gear wheel GW driven by the planetary wheels in order to arrest their further planetary rotation round the driving wheel CP of the motor. Accordingly the motor drive is now diverted to the outer ring OR which rotates in a clockwise direction and the pin OP carried on its circumference causes the wheel driving the cam shaft to be rotated one quarter of a revolution. Electrical contact springs SP are therefore closed to perform the required switching operation and although the high frequency signal may cease shortly after this operation has been performed and thus release the braking sprag S, rotation of the outer ring continues as a result of the drag of the gearing until the operating pin OP is positioned opposite a succeeding slot in the driving wheel W of the cam shaft. The outer ring is then again arrested and the planetary wheels commence to idle around the driving wheel of the motor in an anti-clockwise direction as already explained.

On receipt of the next high frequency signal which is assumed to be of the same character as that previously transmitted, the cam shaft is rotated another quarter of a revolution to open the electrical contact springs which were previously closed.

It will be understood that the invention is not limited to the simple on and off switching operation described, since obviously a number of cams and spring sets could be driven from the cam shaft to produce different combinations of switching operations. Moreover the cam shaft driving wheel could be advanced through two or more steps by a signal of sufficient length.

In case it should be thought desirable to make the device unresponsive to the cumulative effect of parasitic impulses corresponding in frequency to the signalling impulses, it might be arranged that the pin in the outer ring was normally stopped in a position appreciably distant from the slot in the driving wheel of the cam shaft and was moved thereto against the action of a spring. This might for instance be secured to the outer ring so as to tend to restore it to the position in which the pin OP was diametrically opposite to the wheel W. In these circumstances the arrangements would be such that only signalling pulses of a predetermined length would produce a switching operation, and that parasitic impulses which would not be of sufficient length to produce operation would be immediately neutralised after their cessation by the action of the spring so that the switching device would move to a zero position after every individual pulse whatever its nature.

In an alternative arrangement the epicyclic gear might be dispensed with and the wheel to which the sprag member is applied be driven by a yielding drive. Thus when a signal was received the wheel would be arrested and the drive would slip. Conveniently the drive might comprise a pair of crown wheels having teeth with sloping faces and arranged so that one wheel was movable axially against the action of a spring. This axial movement due to the slipping of the drive could be utilised to operate pawl and ratchet mechanism and it will be appreciated that with suitable dimensioning of the parts such an arrangement also would not be effected by transient parasitic currents.

Fig. 3 shows a possible arrangement. In this case also the mains are represented by 1 and 2 and connected across them is an energizing coil operating a vibrating reed R carrying a sprag member S. The motor M through two reduction gears G1 and G2 drives the crown wheels CW1 and CW2. CW2 is rigidly fixed to a shaft AS which is movable axially against the action of the spring PS which bears against the fixed support FS. Also fixed to the shaft AS is the gear wheel G3 which meshes with the wheel G4 which is of sufficient width to ensure satisfactory engagement in spite of the axial movement of wheel G3. The shaft AS is provided with a groove G in which engages a member MB carrying a pawl PL which engages with a ratchet wheel RW.

Normally the effect of the spring PS is to ensure that the crown wheels CW1 and CW2 remain in engagement so that the wheel G3 drives G4 idly. When the reed R vibrates in response to a signal however, the sprag member S arrests the wheel G4 and hence also G3 and the shaft AS. Consequently the drive from the motor causes the crown wheel CW1 to move crown wheel CW2 to the right against the action of the spring PS and hence the pawl PL cooperates with the ratchet wheel RW to effect its rotation. The ratchet wheel is arranged to drive a cam which serves to operate suitable contact springs in substantially the manner shown in Figs. 1 and 2.

I claim:

1. A switching device including a continuously driven gear, a train of gears normally driven by said first gear, circuit controlling contacts, a tuned reed carrying a sprag member, electromagnetic means for at times vibrating said reed to cause said member to directly engage one of the gears in said train to momentarily stop that gear, and means controlled by the stopping of said one gear to cause movement of another gear to thereby operate said contacts.

2. A switching device including circuit controlling contacts for operation, a crypto gear for controlling said contacts, means for continuously driving the center gear and the planetary gears and for normally braking the annular gear, a tuned reed carrying a sprag member on one end thereof, electromagnetic means for vibrating said means momentarily to stop movement of the planetary gears about their common axis, a step by step device for closing and opening said contacts, the stopping of the planetary gears causing movement of the annular gear to operate said device one step to open or close said contacts.

PHILIP NORTON ROSEBY.